3,094,542
21 - SUBSTITUTED - 3,17α - DIHYDROXY - 11,20 - DIKETOALLOPREGNANES AND PROCESS OF PREPARING THEM

Earl M. Chamberlin, Westfield, N.J., assignor to Merck & Co., Inc., Rahway, N.J., a corporation of New Jersey
No Drawing. Filed Apr. 17, 1961, Ser. No. 103,262
14 Claims. (Cl. 260—397.45)

This invention is concerned generally with novel chemical compounds of the cyclopentanopolyhydrophenanthrene series and processes for preparing the same. More particularly, it relates to the novel compound, 3(β),17(α)-dihydroxy-11,20-diketoallopregnane, acyl derivatives thereof, and processes for the preparation of these compounds. This application is a continuation-in-part of copending application Serial No. 440,851, filed July 1, 1954 now Patent No. 2,980,712 which, in turn, is a continuation-in-part of applications Serial No. 225,287, filed May 8, 1951, now abandoned and Serial No. 240,280, filed August 3, 1951, now abandoned.

The novel cyclopentanopolyhydrophenanthrene compounds, 3(β),17(α)-dihydroxy-11,20-diketoallopregnane and the 3-acyloxy derivatives thereof can be used as starting materials in the preparation of other valuable organic compounds, and particularly as starting materials for the preparation of cyclopentanopolyhydrophenanthrene compounds similar in structure to those of the adrenal cortex. Thus, the 3,17α-dihydroxy-11,20-diketoallopregnane can be converted to the corresponding 3, 11,20 - triketo - 17α - hydroxy - 21 - acyloxy-allopregnane which, in turn, is valuable as an intermediate in the synthesis of steroid hormones having an oxygen atom attached to the 11-carbon atom, such as Δ¹-3,11-20-triketo-17α-hydroxy-21-acyloxy-allopregnane, as well as the adrenal hormones cortisone and Compound F. The conversion of the 3,17α-dihydroxy-11,20-diketo-allopregnane to 3,11,20-triketo-17α-hydroxy-21-acetoxy-allopregnane is conducted by reacting said 3,17-dihydroxy-11,20-diketo-allopregnane with bromine, thereby forming 3,17-dihydroxy-11,20-diketo-21-bromo-allopregnane, reacting this 21-bromo-allopregnane compound with an alkali metal acetate, thereby forming 3,17-dihydroxy-11,20-diketo-21-acetoxy-allopregnane. The latter compound is reacted with an oxidizing agent to produce the desired 3,11,20 - triketo - 17 - hydroxy - 21 - acetoxy-allopregnane.

In carrying out the reaction of this 3,17-dihydroxy-11,20-diketo-allopregnane with bromine it is ordinarily preferred to bring the reactants into intimate contact in a liquid medium, preferably in a halogenated hydrocarbon solvent inert to bromine such as chloroform, and the like. The reaction is preferably carried out at a temperature of approximately 45–50° C., and the reaction is allowed to proceed substantially to completion as evidenced by the fading of the bromine coloration of the solution. The brominated reaction solution is then ordinarily extracted with an aqueous alkaline solution to remove acidic by-products, and the organic layer is then evaporated in vacuo to yield the intermediate 3,17 - dihydroxy - 11,20 - diketo - 21 - bromo - allopregnane which can be purified, if desired, by recrystallization from an organic solvent such as acetonitrile.

The 3,17 - dihydroxy - 11,20 - diketo - 21 - bromo-allopregnane is then reacted with an alkali metal acetate, preferably in solution in an organic solvent such as acetone. It is ordinarily preferred to dissolve the 3,17-dihydroxy-11,20-diketo-21-bromo-allopregnane in acetone and then to add to the solution a mixture of potassium bicarbonate, glacial acetic acid, and potassium iodide, the potassium iodide serving as a catalyst for the reaction. The resulting mixture is then heated at an elevated temperature, preferably under reflux, for a period of about four hours, at the end of which time the acetone is evaporated, and the residual material is triturated with water to give the desired 3,17-dihydroxy-11,20-diketo-21-acetoxyallopregnane.

The 3,17 - dihydroxy - 11,20 - diketo - 21 - acetoxy-allopregnane is then reacted with an oxidizing agent, preferably N-bromoacetamide. This reaction is conveniently carried out by dissolving the 3,17-dihydroxy-11,20-diketo-21-acetoxy-allopregnane in a lower aliphatic alcohol, such as methanol, containing a small amount of a tertiary amine, such as pyridine, and adding to the resulting solution a solution of the N-bromoacetamide in the lower aliphatic alcohol. The resulting mixture is allowed to stand, preferably for about twelve hours, to effect oxidation of the 3-hydroxy-substituent. The reaction mixture is then treated with a reducing agent, such as allyl alcohol, to destroy excess N-bromoacetamide, and the mixture is then acidified with an aqueous solution of a mineral acid. The acidified solution is then triturated with water, thereby precipitating the desired 3,11,20-triketo - 17 - hydroxy - 21 - acetoxy-allopregnane which can be further purified, if desired, by recrystallization from an organic solvent such as acetone. These reactions may be chemically represented as follows:

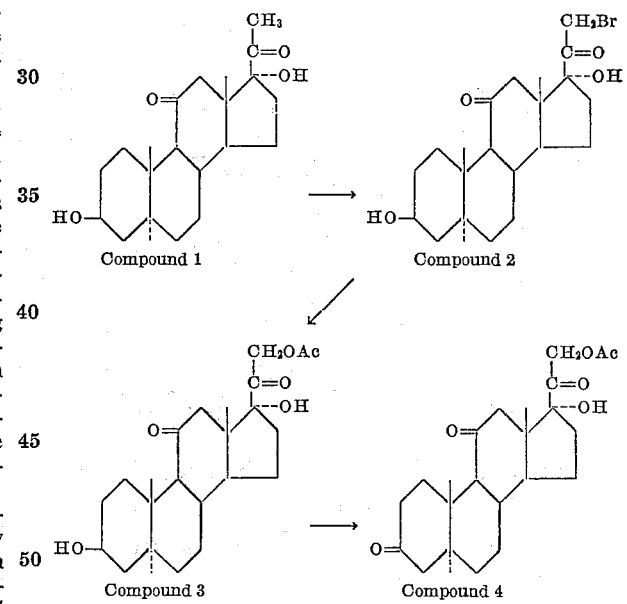

As previously set forth, the reactions indicated above are conducted by reacting the 3,17-dihydroxy-11,20-diketo-allopregnane (Compound 1) with bromine, thereby forming 3,17 - dihydroxy - 11,20 - diketo - 21 - bromo-allopregnane (Compound 2), reacting this 21-bromo-allopregnane compound with an alkali metal acetate, thereby forming 3,17 - dihydroxy - 11,20 - diketo - 21 - acetoxy-allopregnane (Compound 3). The latter compound is reacted with an oxidizing agent to produce the desired 3,11,20 - triketo - 17 - hydroxy - 21 - acetoxy-allopregnane (Compound 4). This 3,11,20-triketo-17-hydroxy-21-acetoxy-allopregnane is then converted to cortisone acetate in accordance with the procedures set forth in Nature 168, page 28 (July 1951). Although the foregoing reactions are applied to the preparation of 3,11,20-triketo - 17α - hydroxy - 21 - acetoxy-allopregnane, other 3,11,20 - triketo - 17α - hydroxy - 21 - acyloxy-allopregnanes and particularly, 3,11,20-triketo-17α-hydroxy-21-lower alkanoyloxy-allopregnanes are conveniently prepared by reacting the 3,17α-dihydroxy-11,20-diketo-21- bromo-allopregnane (Compound 2) with (in place of the alkali metal acetate) another alkali metal salt of lower fatty acid such as an alkali metal propionate, an alkali metal butyrate, an alkali metal valerate, and the like, thereby forming the corresponding 3,17α-dihydroxy-11, 20-diketo-21-lower alkanoyloxy-allopregnane which, upon reaction with the oxidizing agent, is converted to the 3,11,20 - triketo - 17α - hydroxy - 21 - lower alkanoyloxy-allopregnane. These 3,11,20 - triketo - 17α - hydroxy-21-lower alkanoyloxy-allopregnanes are converted to the corresponding cortisone 21-lower alkanoates in accordance with the procedure of Nature 168, page 28.

Alternatively, 3(β),17(α)-dihydroxy-11,20-diketo-allopregnane can be oxidized to the corresponding 3-keto compound by reaction with chromium trioxide. The resulting 3,11,20-triketo-17α-hydroxy-allopregnane can be converted to 3,11,20-triketo-17α-hydroxy-21-acetoxy-allopregnane by reaction with lead tetraacetate in glacial acetic acid. Upon reacting the 3,11,20-triketo-17α-hydroxy-21-acetoxy-allopregnane with bromine to obtain the corresponding 2,4-dibromo derivative, treating the dibromo derivative with sodium iodide to form the Δ⁴-2-iodo-3-keto-compound, and reacting the latter product with chromous chloride, Δ⁴-3,11,20-triketo-17α-hydroxy-21-acetoxy pregnene (cortisone acetate) is obtained.

The acyl derivatives of 3(β),17(α)-dihydroxy-11,20-diketo-allopregnane can be synthesized from esters of 3(β)-hydroxy-11-keto-allobisnorcholanic acid by reactions indicated as follows:

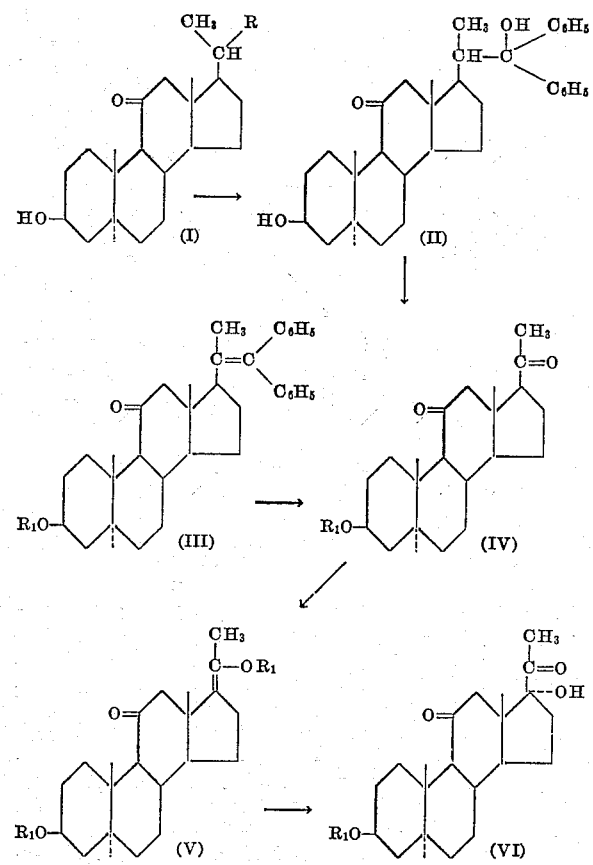

wherein R represents an esterified carboxy group, and R₁ represents an acyl substituent.

In this synthesis, an ester of 3(β)-hydroxy-11-keto-allobisnorcholanic acid ( I ) is first reacted with an aryl Grignard reagent to form 3(β)-hydroxy-11-keto-20-allopregnanyl diphenyl carbinol, which on reaction with a suitable acylating agent is converted to 3(β)-acyloxy-11-keto-alloetiocholanyl methyl diphenyl ethylene (III). Upon reacting this product (III) with ozone, 3(β)-acyloxy-11,20-diketo-allopregnane (IV) is formed. The latter product is then reacted with an acylating agent to form the corresponding enol ester (V) which on reaction with an organic per-acid is converted to the desired 17α-hydroxy compound (VI).

In the first step of this synthesis, an aryl Grignard reagent, such as phenyl magnesium bromide, is reacted with an ester of 3(β)-hydroxy-11-keto-allobisnorcholanic acid to form 3(β)-hydroxy-11-keto-20-allopregnanyl diphenyl carbinol. This reaction is carried out under anhydrous conditions in a suitable solvent medium such as ether-benzene in the presence of N-ethyl morpholine. After the reaction is completed, the product can be isolated by acidifying the reaction mixture with an inorganic acid such as hydrochloric acid, then adjusting the pH to slight alkalinity by the addition of solid sodium carbonate, and steam distilling the resulting reaction mixture to remove the solvents. The crude residue so obtained may be used directly in the next step of the process, or, if desired, may be further purified by crystallization to isolate the pure carbinol.

In the next step of my process, the carbinol is simultaneously dehydrated and acylated to obtain 3(β)-acyloxy-11-keto-alloetiocholanyl methyl phenylethylene. I find that this reaction is most conveniently effected by refluxing the carbinol with a mixture of acetic acid and acetic anhydride.

The 3(β)-acyloxy-11-keto-alloetiocholanyl methyl diphenyl ethylene dissolved in a suitable solvent, such as chloroform, is then subjected to ozonolysis at low temperatures to effect the degradation of the side chain and form 3(β)-acyloxy-11,20-diketo-allopregnane.

The latter product is then treated with an acylating agent in the presence of an acid catalyst, whereby the 20-keto substituent is enolized to form the corresponding 20-enol acylate which is reacted with an organic per-acid, such as monperphthalic acid to form 3(β)-acyloxy-17α-hydroxy-11,20-diketo-allopregnane. This product is then readily hydrolyzed with alkali to obtain 3(β), 17(α)-dihydroxy-11,20-diketo-allopregnane.

In carrying out the processes of the present invention, any ester of 3(β)-hydroxy-11-keto-allobisnorcholanic acid can be used as the starting material, although, generally, I prefer to use an ester of a lower aliphatic alcohol since such esters are readily and conveniently prepared. Examples of preferred starting materials that might be mentioned are, methyl 3(β)-hydroxy-11-keto-allobisnorcholanate, ethyl 3(β)-hydroxy - 11 - keto-allobisnorcholanate, propyl 3(β)-hydroxy - 11 - keto-allobisnorcholanate, and butyl 3(β)-hydroxy-11-keto-allobisnorcholanate.

The step of converting 3(β)-hydroxy-11-keto-20-allopregnanyl diphenyl carbinol to 3(β)-acyloxy-11-keto-alloetiocholanyl methyl diphenyl ethylene is preferably effected by heating with a lower fatty acid, a lower fatty acid anhydride, or a mixture of the acid and the anhydride.

The step of converting 3(β)-acyloxy-11,20-diketo allopregnane to the corresponding enol ester is also preferably effected by heating with a lower fatty acid anhydride in the presence of a small amount of an acid catalyst such as p-toluenesulfonic acid.

The following examples are presented as illustrative embodiments of my invention.

EXAMPLE 1

*Preparation of 3(β) - Hydroxy-11-Keto-20-Allopregnanyl Diphenyl Carbinol from Methyl - 3(β) - Hydroxy-11-Keto-Allobisnorcholanate*

Phenyl magnesium bromide was prepared in the usual manner from 3 g. of magnesium, 14 cc. of bromo-benzene and 50 cc. dry absolute ether. To the ethereal solution of the Grignard reagent was added 23 cc. of dry N ethyl morpholine and 12 cc. of dry benzene followed by 4.7 g. of methyl 3(β)-hydroxy-11-keto-allobisnorcholanate dissolved in 23 cc. of dry N ethyl morpholine and 12 cc.

of dry benzene. The ester solution was added to the Grignard reagent at 15° C. over a period of 45 minutes. After the addition was complete an additional 23 cc. of dry N ethyl morpholine and 12 cc. of dry benzene was added. The reaction mixture was stirred at room temperature for 4 days and then for 6 hours at 50–55° C. After standing overnight the reaction mixture was poured onto 500 g. of ice and 71 cc. of concentrated hydrochloric acid. The pH was adjusted to slight alkalinity by the addition of solid sodium carbonate and the heterogeneous mixture steam distilled 4 hours after all the solvent was removed. The solidified crude product was filtered off and taken up in a liter of hot benzene. The warm benzene solution was washed successively with 100 cc. of water, 100 cc. of 2.5 N sodium hydroxide and finally with water. The washed benzene solution was dried over anhydrous magnesium sulfate, concentrated in vacuo to the point of crystallization, cooled, and filtered to yield 3.2 g. of 3($\beta$)-hydroxy-11-keto-20-allopregnanyl diphenyl carbinol, melting at 239.5–240.5° C., and having a specific rotation of $[\alpha]_D^{23} = -22.5$ in chloroform.

A small sample recrystallized from methanol melted at 244.5–249° C.

*Analysis.*—Calc'd. for $C_{34}H_{44}O$: C, 81.55; H, 8.86. Found: C, 81.79; H, 8.96.

EXAMPLE 2

*Preparation of 3($\beta$)-Acetoxy - 11 - Keto-Alloetiocholanyl Methyl Diphenyl Ethylene from 3($\beta$) - Hydroxy - 11-Keto-Allopregnanyl Diphenyl Carbinol*

A solution of 2.4 g. of 3($\beta$)-hydroxy-11-keto-allopregnanyl diphenyl carbinol in 50 cc. of glacial acetic acid, was refluxed for 3 hours, then 25 cc. of acetic anhydride was added and the refluxing continued for another 3 hours. On cooling the acetylated compound, 3($\beta$)-acetoxy-11-keto alloetiocholanyl methyl diphenyl ethylene, melting at 263.5–266° C. crystallized out. A small sample recrystallized from methanol-chloroform melted at 267–268.5° C., and had a U.V. absorption of $\lambda$ max. 2440 uE% 237 in alcohol. Specific rotation $$[\alpha]_D^{23} = +22$$

in chloroform.

*Analysis.*—Calc'd. for $C_{36}H_{44}O_3$: C, 82.40; H, 8.45. Found: C, 82.27; H, 8.56.

EXAMPLE 3

*Preparation of 3($\beta$)-Acetoxy-11-Keto Alloetiocholanyl Methyl Diphenyl Ethylene From 3-Hydroxy-11-Keto-Allobisnorcholanate*

Phenyl magnesium bromide was prepared in the usual manner from 1.5 g. of magnesium, 7 cc. of bromo-benzene and 35 cc. of dry absolute ether. To the solution of Grignard reagent was added 6 cc. of dry benzene and 12 cc. of dry N ethyl morpholine. Ether was then distilled off. The resultant pasty mass was cooled to 10° C. and 2.3 g. of methyl 3($\beta$)-hydroxy-11-keto allobisnorcholanate dissolved in 6 cc. of dry benzene and 12 cc. of dry N ethyl morpholine was added to the Grignard reagent, keeping the temperature between 10–15° C. The reaction mixture was then stirred at room temperature for 3 days.

The resulting reaction mixture was decomposed by pouring it onto 125 g. of ice and 39 cc. of concentrated hydrochloric acid. The aqueous layer was separated and extracted three times with 75 cc. benzene. The combined benzene extracts were steam distilled for 4 hours after all the solvent had been removed. The product was removed from the aqueous layer and taken up in benzene, dried over anhydrous magnesium sulfate and the benzene removed in vacuo. The crude 3($\beta$)-hydrdoxy-11-keto-20-allopregnanyl carbinol so obtained was dehydrated by refluxing 3 hours with 75 cc. glacial acetic acid. The acetic acid was removed in vacuo, the residue dissolved in ether, washed with water, dried over anhydrous magnesium sulfate and concentrated in vacuo. The residue was saponified with 5% methanolic potassium hydroxide poured into water and extracted with ether. The ether was dried over anhydrous magnesium sulfate and evaporated on the steam bath. The residue was acetaylated in 15 cc. dry pyridine and 5 cc. of acetic anhydride. The acetylation solution was diluted with water and the product which precipitated was taken up in ether. The ether was dried over anhydrous sodium carbonate after washing with 2.5 N hydrochloric acid and water. The solvent was evaporated on the steam bath and the residue recrystallized from methanol to yield impure 3($\beta$)-acetoxy-11-ketoalloetiocholanyl methyl diphenyl ethylene melting at 254–255° C., and having a U.V. absorption of $\lambda$max. (alcohol) 2450 E% 205.

EXAMPLE 4

*Preparation of 3($\beta$)-Acetoxy-11,20-Diketo Allopregnane From 3($\beta$)-Acetoxy-11-Keto Alloetiocholanyl Methyl Diphenyl Ethylene*

A solution of 1.5 g. of 3($\beta$)-acetoxy-11-keto-alloetiocholanyl methyl diphenyl ethylene in 100 cc. of chloroform was ozonized at −50° C. to −70° C. The resulting ozonized solution was stirred 25 minutes with 2 g. of zinc dust and 5 cc. of glacial acetic acid. After filtration of the zinc the solvent was removed in vacuo and the residue steam distilled for 4 hours. The product was taken up in ether, dried over anhydrous magnesium sulfate and the solvent evaporated on a steam bath. The residue crystallized on moistening with methanol and standing in the ice box. Recrystallized from aqueous methanol the 3($\beta$)-acetoxy-11,20-diketo allopregnane melted at 141–143° C., and had a specific rotation of $[\alpha]_D^{23} = +88$ in chloroform.

*Analysis.*—Calc'd. for $C_{24}H_{34}O_3$: C, 73.76; H, 9.15. Found: C, 73.79; H, 8.90.

Melting point of 3,5-dinitrophenyl hydrazone derivative 234–235° C

*Analysis.*—Calc'd. for $C_{29}H_{37}O_7$: C, 62.91; H, 6.74; N, 10.12. Found: C, 62.93; H, 6.90; N, 10.13.

EXAMPLE 5

*Preparation of 3($\beta$),17($\alpha$)-Dihydroxy-11,20-Diketo Allopregnane From 3($\beta$)-Acetoxy-11,20-Diketo Allopregnane*

A solution of 1.4 g. of 3($\beta$)-acetoxy-11,20-diketo allopregnane in 10 cc. of acetic anhydride was heated for 4 hours on the steam bath with 250 mgs. p-toluenesulfonic acid monohydrate. The reaction mixture was poured onto ice in a separatory funnel and extracted twice with 100 cc. of ethyl acetate. The ethyl acetate was washed with sodium bicarbonate solution and saturated sodium chloride solution. The ethyl acetate solution was dried over anhydrous magnesium sulfate and concentrated to small volume. Fifteen cubic centimeters of 0.53 M monoperphthalic acid solution were added and the reaction mixture allowed to stand overnight.

The resulting mixture was diluted with 75 cc. of ethyl acetate and the excess per-acid washed out with 0.5 N sodium hydroxide and finally with water. The ethyl acetate solution was then dried with anhydrous magnesium sulfate and concentrated in vacuo. The residue was hydrolyzed in 5% methanolic potassium hydroxide at room temperature. Crystalline material deposited which was filtered off and the filtrate diluted with 500 cc. of water which was then acidified and extracted 3 times with 50 cc. of chloroform. The chloroform extract was dried over anhydrous sodium carbonate and evaporated on the steam bath to yield 3($\beta$),17($\alpha$)-dihydroxy-11,20-diketo allopregnane. Recrystallized from methanol the product melted at 290–292° C.

*Analysis.*—Calc'd. for $C_{21}H_{32}O_4$: C, 72.38; H, 9.26. Found: C, 72.98; H, 9.74.

EXAMPLE 6

*Preparation of 3,17-dihydroxy-11,20-diketo-21-bromo-allopregnane*

Two hundred milligrams of 3,17-dihydroxy-11,20-diketo-allopregnane were dissolved in 70 cc. of chloroform, and to this solution was added 5.5 cc. of a 0.1 M solution of bromine in chloroform while maintaining the temperature within the range of about 45–50° C. The mixture was allowed to stand until the bromine became decolorized, and the reaction solution was then extracted with 6 cc. of a saturated aqueous solution of sodium bicarbonate. The chloroform layer was then dried over anhydrous calcium sulfate, filtered, and the dry chloroform solution was then evaporated in vacuo. The residual material was recrystallized from acetonitrile to give 130 mg. of substantially pure 3,17-dihydroxy-11,20-diketo-21-bromo-allopregnane; M.P. 238–240° C., dec.

*Analysis.*—Calc'd. for $C_{21}H_{31}O_4Br$: Br, 18.39. Found: Br, 18.69.

EXAMPLE 7

*Preparation of 3,17-dihydroxy-11,20-diketo-21-acetoxy-allopregnane*

To a solution of 130 mg. of 3,17-dihydroxy-11,20-diketo-21-bromo-allopregnane in 28 cc. of boiling acetone was added 162 mg. of potassium bicarbonate, 0.1 cc. of glacial acetic acid and 83 mg. of potassium iodide. The resulting mixture was heated under reflux for a period of approximately four hours at the end of which time the acetone was evaporated under reduced pressure, and the residual material was triturated with water to give 97 mg. of 3,17-dihydroxy-11,20-diketo-21-acetoxy-allopregnane; M.P. 233–235° C.

*Analysis.*—Calc'd. for $C_{23}H_{34}O_6$: C, 67.95; H, 8.43. Found: C, 68.78; H, 8.34.

EXAMPLE 8

*Preparation of 3,11,20-triketo-17-hydroxy-21-acetoxy-allopregnane*

Ninety-seven milligrams of 3,17-dihydroxy-11,20-diketo-21-acetoxy-allopregnane were dissolved in 5 cc. of methanol containing 0.1 ml. of pyridine. A solution containing 80 mg. of N-bromoacetamide dissolved in 2 cc. of methanol was added to the solution of the allopregnane compound, and the resulting solution was allowed to stand at room temperature for a period of approximately twelve hours. Two-tenths cubic centimeters of allyl alcohol was added to the reaction solution, and the resulting mixture was acidified with 1 cc. of 2.5 N aqueous hydrochloric acid solution. The acidified solution was diluted with water, and the precipitated material was recovered by filtration and purified by recrystallization from acetone to give substantially pure 3,11,20-triketo-17-hydroxy-21-acetoxy-allopregnane, M.P. 229–233° C.; $[\alpha]_D^{24°}$ C.=+100° (chloroform).

*Analysis.*—Calc'd. for $C_{23}H_{32}O_6$: C, 68.29; H, 7.97. Found: C. 68.46; H, 7.68.

Various changes and modifications may be made in carrying out the present invention without departing from the spirit and scope thereof. Insofar as these changes and modifications are within the purview of the annexed claims they are to be considered as part of my invention.

I claim:

1. The process which comprises reacting $3(\beta),17\alpha$-dihydroxy-11,20-diketo-allopregnane with bromine in a halogenated hydrocarbon solvent at a temperature of approximately 45–50° C. to form $3(\beta),17\alpha$-dihydroxy-11,20-diketo-21-bromo-allopregnane, reacting this compound with an alkali metal acetate to produce $3(\beta),17\alpha$-dihydroxy-11,20-diketo-21-acetoxy-allopregnane, and reacting said $3(\beta),17\alpha$-dihydroxy-11,20 - diketo - 21 - acetoxy - allopregnane with N-bromo-acetamide to produce 3,11,20-triketo-17α-hydroxy-21-acetoxy-allopregnane.

2. The process which comprises reacting $3(\beta),17\alpha$-dihydroxy-11,20-diketo-allopregnane with bromine, said reaction being carried out by bringing the reactants together in chloroform solution at a temperature within the range of about 45–50° C., to produce $3(\beta),17\alpha$-dihydroxy-11,20-diketo-21-bromo-allopregnane, bringing the latter compound into intimate contact with potassium bicarbonate, glacial acetic acid and potassium iodide in a medium comprising acetone, and heating the resulting mixture under reflux for a period of approximately four hours, thereby forming $3(\beta),17\alpha$-dihydroxy-11,20-diketo-21-acetoxy-allopregnane, and reacting said $3(\beta),17\alpha$-dihydroxy-11,20-diketo-21-acetoxy-allopregnane with N-bromoacetamide, said reaction being carried out by allowing the reactants to stand in methanol solution containing a small amount of pyridine, to produce 3,11,20-triketo-17α-hydroxy-21-acetoxy-allopregnane.

3. The process which comprises reacting $3(\beta),17\alpha$-dihydroxy-11,20-diketo-allopregnane with bromine in a halogenated hydrocarbon solvent at a temperature of approximately 45–50° C. to produce $3(\beta),17\alpha$-dihydroxy-11,20-diketo-21-bromo-allopregnane.

4. The process which comprises reacting $3(\beta),17\alpha$-dihydroxy-11,20-diketo-allopregnane with bromine, said reaction being carried out by heating the reactants together in chloroform solution at a temperature within the range of about 45–50° C., to produce $3(\beta),17\alpha$-dihydroxy-21-bromo-allopregnane.

5. The process which comprises reacting $3(\beta),17\alpha$-dihydroxy - 11,20 - diketo - 21-bromo-allopregnane with an alkali metal acetate to form $3(\beta),17\alpha$-dihydroxy-11,20-diketo-21-acetoxy-allopregnane.

6. The process which comprises reacting $3(\beta),17\alpha$-dihydroxy-11,20-diketo-21-bromo-allopregnane with potassium acetate, said reaction being carried out by bringing said $3(\beta),17\alpha$-dihydroxy-11,20-diketo-21-bromo-allopregnane into intimate contact with potassium carbonate, glacial acetic acid, and potassium iodide in a medium comprising acetone, and heating the resulting mixture under reflux for a period of approximately four hours, thereby forming $3(\beta),17\alpha$-dihydroxy-11,20-diketo-21-acetoxy-allopregnane.

7. The process which comprises reacting $3(\beta),17\alpha$-dihydroxy-11,20-diketo-21-acetoxy-allopregnane with N-bromoacetamide to form 3,11,20-triketo-17α-hydroxy-21-acetoxy-allopregnane.

8. The process which comprises reacting $3(\beta),17\alpha$-dihydroxy-11,20-diketo-21-acetoxy-allopregnane with N-bromoacetamide, said reaction being carried out by allowing the reactants to stand together at room temperature in a methanol solution containing a small amount of pyridine, thereby forming 3,11,20-triketo-17α-hydroxy-21-acetoxy-allopregnane.

9. $3(\beta),17\alpha$-dihydroxy-11,20-diketo - 21 - bromoallopregnane.

10. $3(\beta),17\alpha$-dihydroxy - 11,20-diketo-21-acetoxy-allopregnane.

11. A process for the production of allopregnane-17α,21-diol-3,11,20-trione 21-acetate which comprises treating allopregnane-$3(\beta),17\alpha$-diol-11,20-dione with bromine to produce 21-bromo-allopregnane-$3(\beta),17\alpha$-diol-11,20-dione, treating the 21-bromo-allopregnane-$3(\beta),17\alpha$-diol-11,20-dione with an alkali metal acetate to produce allopregnane-$3(\beta),17\alpha,21$-triol-11,20-dione 21-acetate, and oxidizing the latter compound with N-bromoacetamide in the presence of pyridine to obtain allopregnane-17α-21-diol-3,11,20-trione 21-acetate.

12. A process for the production of 21-bromo-allopregnane-$3\beta,17\alpha$-diol-11,20-dione which comprises treating allopregnane-$3\beta,17\alpha$-diol-11,20-dione with 1 mol of bromine to selectively brominate said dione.

13. A process for the production of allopregnane-17α,21-diol-3,11,20-trione 21-acylate which comprises treating allopregnane-$3(\beta),17\alpha$-diol-11,20-dione with bromine to produce 21-bromo-allopregnane-$3(\beta),17\alpha$-diol- 11,20-dione, treating the 21-bromo-allopregnane-3($\beta$), 17$\alpha$-diol-11,20-dione with an alkali metal salt of a lower fatty acid to produce allopregnane-3($\beta$),17$\alpha$,21-triol-11,20-dione 21-lower alkanoate, and oxidizing the latter compound with N-bromoacetamide in the presence of pyridine to obtain allopregnane-17$\alpha$,21-diol-3,11,20-trione 21-lower alkanoate.

14. 3($\beta$),17$\alpha$-dihydroxy-11,20-diketo - 21 - lower alkanoyloxy-allopregnane.

References Cited in the file of this patent

UNITED STATES PATENTS 2,596,563     Kaufmann et al. _____ May 13, 1952

OTHER REFERENCES

Pataki et al.: "J.A.C.S.," vol. 74, pages 5615–5616, Nov. 20, 1952.